United States Patent
Curran et al.

(10) Patent No.: US 11,223,703 B2
(45) Date of Patent: Jan. 11, 2022

(54) INSTRUCTION INITIALIZATION IN A DATAFLOW ARCHITECTURE

(71) Applicant: INTERNATIONAL BUSINESS MACHINES CORPORATION, Armonk, NY (US)

(72) Inventors: Brian Curran, Saugerties, NY (US); Bruce Fleischer, Yorktown Heights, NY (US); Kailash Gopalakrishnan, San Jose, CA (US); Sunil K Shukla, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 16/358,356

(22) Filed: Mar. 19, 2019

(65) Prior Publication Data
US 2020/0304598 A1   Sep. 24, 2020

(51) Int. Cl.
*H04L 29/08*   (2006.01)
*H04L 29/06*   (2006.01)

(52) U.S. Cl.
CPC .............. *H04L 67/34* (2013.01); *H04L 67/10* (2013.01); *H04L 69/22* (2013.01)

(58) Field of Classification Search
CPC .......... H04L 67/34; H04L 67/10; H04L 69/22
See application file for complete search history.

(56) References Cited

U.S. PATENT DOCUMENTS

| | | | |
|---|---|---|---|
| 4,814,978 A | 3/1989 | Dennis | |
| 6,272,672 B1 | 8/2001 | Conway | |
| 8,595,391 B1 | 11/2013 | Miller et al. | |
| 2006/0005228 A1* | 1/2006 | Matsuda | H04L 63/0263 726/1 |
| 2010/0313092 A1* | 12/2010 | Xu | G06F 11/2236 714/738 |
| 2014/0146818 A1* | 5/2014 | Shekhar | H04L 49/351 370/392 |
| 2015/0294026 A1 | 10/2015 | Iskander et al. | |
| 2017/0286342 A1* | 10/2017 | Derler | G06F 9/5066 |

(Continued)

OTHER PUBLICATIONS

"Dataflow architectures: Flexible platforms for neural network simulation." Ira G. Smotroff MITRE-Bedford Neural Network Group (8 Pages).

(Continued)

*Primary Examiner* — Nicholas P Celani
(74) *Attorney, Agent, or Firm* — Griffiths & Seaton PLLC

(57) ABSTRACT

Various embodiments are provided for implementing instruction initialization in a dataflow architecture in a computing environment. A data packet may be transmitted from a selected node to one or more of a plurality of nodes using one or more existing data paths in an initialization network. A determination operation is performed to determine whether one or more of a plurality of nodes is a target node intended for the data packet. Those of the plurality of nodes determined to be a target node initialize one or more components of the target node using the data packet. The data packet may be forwarded by each of the one or more of a plurality of nodes to a subsequent node in the initialization network.

14 Claims, 8 Drawing Sheets

(56) References Cited

U.S. PATENT DOCUMENTS

2018/0060034 A1    3/2018  Nicol et al.
2019/0007332 A1*   1/2019  Fleming ................ H04L 45/72

OTHER PUBLICATIONS

"Dataflow Architectures and Multithreading" Ben Lee, Oregon State University, A.R. Hurson, Pennsylvania State University Aug. 1994 (13 Pages).
"A Computer Architecture for Data-Flow Computation" An IP.com Prior Art Database Technical Disclosure Authors et. al.: Software Patent Institute Misunas, David P. Massachusetts Institute of Technology MIT Jul. 31, 1975 (215 Pages).
"A Parameterized Dataflow Language Extension for Embedded Streaming Systems" Yuan Lin et al. Advanced Computer Architecture Laboratory University of Michigan at Ann Arbor, Chaitali Chakrabarti Department of Electrical Engineering Arizona State University (8 Pages).

* cited by examiner

INSTRUCTION INITIALIZATION IN A DATAFLOW ARCHITECTURE

BACKGROUND OF THE INVENTION

Field of the Invention

The present invention relates in general to computing systems, and more particularly to, various embodiments for implementing instruction initialization in a dataflow architecture in a computing environment by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for implementing instruction initialization in a dataflow architecture using one or more processors in a computing environment are provided. In one embodiment, by way of example only, a method for implementing instruction initialization in a dataflow architecture in a computing environment, again by a processor, is provided. Initialization data is organized as data packets having one or more flits. A data packet may be transmitted from a selected node to one or more of a plurality of nodes using one or more existing data paths in an initialization network. A determination operation is performed to determine whether one or more of a plurality of nodes is a target node intended for the data packet. Those of the plurality of nodes determined to be a target node initialize one or more components of the target node using the data packet. The data packet may be forwarded by each of the one or more of a plurality of nodes to a subsequent node in the initialization network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
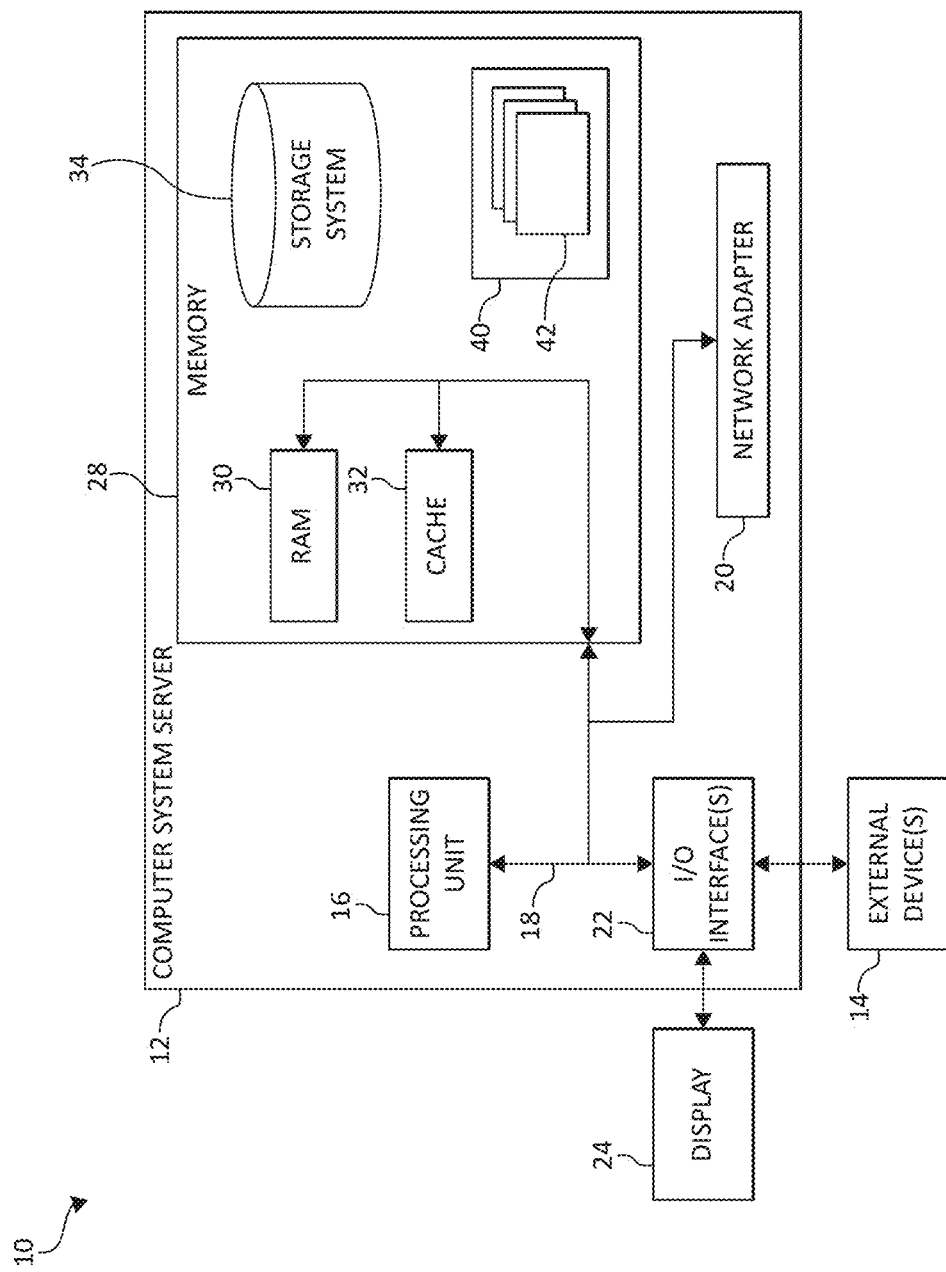
FIG. 1 is a block diagram depicting an exemplary computing node according to an embodiment of the present invention.

As a preliminary matter, a data network facilitates data transfers or "data flows" between two or more data processing systems in a computing environment (e.g., a dataflow architecture). For example, an application executing in one data processing system acts as the sender of the data, and another application executing in another data processing system acts as the receiver of the data. Between the sender system and the receiver system, the data follows a data path that comprises a series of links between networking components, such as routers and switches. A link is also known as a hop. For example, a data network exists between a network interface in the sender system and a network interface in the receiver system.

Additionally, a computing environment may include a deep learning application comprised of one or more kernels which are embarrassingly data parallel. Conventional processors, which are based on Von-Neumann architecture, are unable to exploit the data level parallelism present in these application to the full extent. For example, an instruction fetch and decode engine is too excessive for simplistic operations that deep learning operations entail, leading to sub-optimal silicon processor efficiency and lower performance per unit of power.

Also, dataflow architectures may be composed of several tightly coupled compute nodes, which may perform arithmetic operation or facilitate data transfer, and are suited for processing regular dataflow-oriented algorithms. A compute node executes a program from an instruction buffer (e.g., an "IBuff") that is local to each compute node. The instruction buffer is initialized before the start of execution. However, there is no instruction fetch from outside the compute node during execution. Each compute node receives instructions from its instruction buffer (e.g., an "IBuff") and continues with a decode operation and execute phase simplifying a processor's frontend design and efficiency. Each node may contain, in addition to an instruction buffer, other state data, such as local registers for values used in computation or bits which control the operation of the node. Accordingly, the present invention provides a novel way of initializing the instruction buffer (e.g., an "IBuff") and other state data of each compute node/unit in a dataflow architecture by use of one or more existing data paths for initialization thereby avoiding the use of a separate initialization bus and other associated logic.

In one aspect, the present invention provides a solution for implementing instruction initialization in a dataflow architecture in a computing environment. Initialization data is organized as data packets having one or more flits. A "flit" may be defined as a flow-control unit, the smallest unit of data steered by a network's flow control. Each data packet may be transmitted from a first compute node to one or more of a plurality of compute nodes using one or more existing data paths. One or more components of a target compute node may be initialized using a received data packet and the received data packet may be forwarded to a subsequent compute node.

In one aspect, the present invention utilizes an existing data path to transfer initialization data (including IBuff and other state data). The initialization data may be organized as packets that include one or more flits. Each initialization data packet may include a header, which identifies one or more target compute nodes, as well as the data packet length. Each initialization data packet for a root compute node may be transmitted to all of the compute nodes connected to the root compute node by the initialization network. Each compute node checks the header to determine if it is one of the intended recipients and uses the initialization data packet contents to initialize its instruction buffer and other state data, while also forwarding the data to its child or children nodes in the initialization network.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
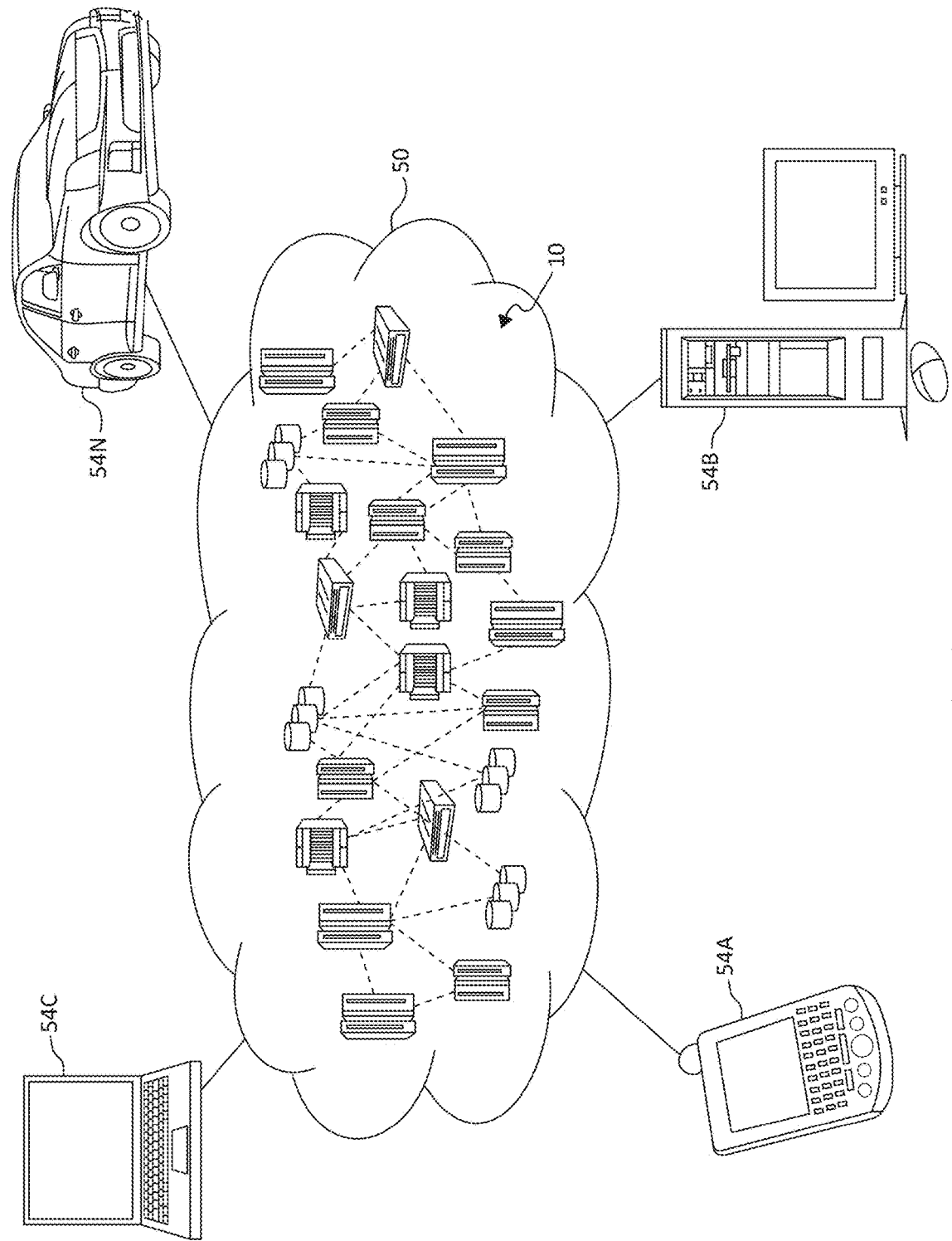
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
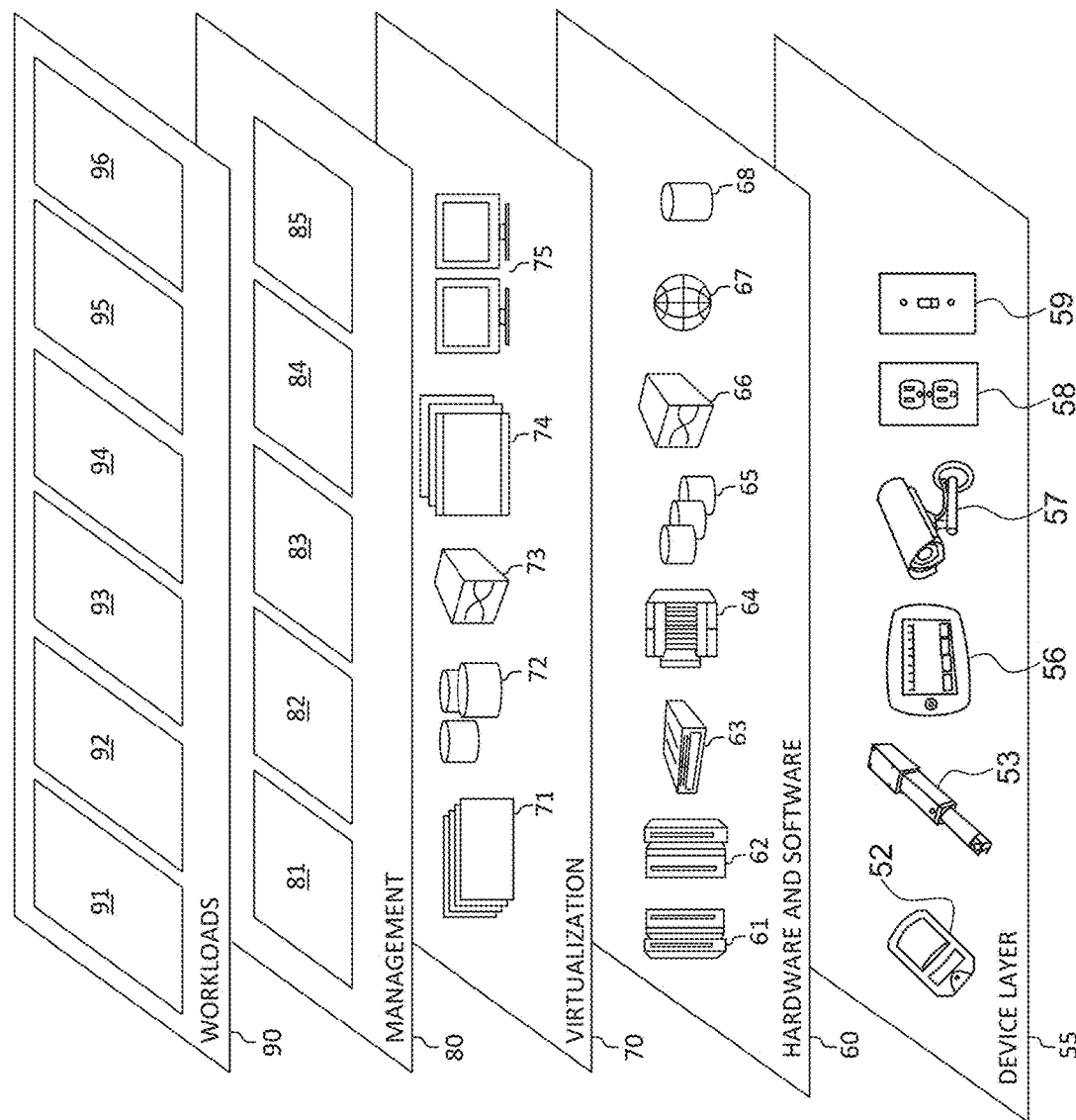
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for instruction initialization in a dataflow architecture. In addition, workloads and functions 96 for instruction initialization in a dataflow architecture may include such operations as data analytics, data analysis, and as will be further described, cryptographic switching functionality. One of ordinary skill in the art will appreciate that the workloads and functions 96 for instruction initialization in a dataflow architecture may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for implementing instruction initialization in a dataflow architecture. In one aspect, the dataflow architecture may include multiple nodes and an existing data network connecting the nodes. The data network may include an initialization network, which may be a tree sub-graph of the existing data network. A root node of the initialization network may transmit each data packet to one or more other nodes of the initialization network. The internal nodes of the initialization network may transmit received data packets to one or more other nodes of the initialization network. Each node (e.g., root, internal nodes and leaf nodes) of the initialization network may analyze the header of each received data packet to determine whether the data packet is intended for that particular node, and if so, one or more components of that node may be initialized with data from that data packet. An instruction buffer in a node of the initialization network may be initiated upon determining, by that node 1) that a received initialization data packet is intended for that node; and 2) that said received initialization data packet contains instruction data.

The root node and every internal node of the initialization network may forward every received initialization data packet to that node's child/children node in the initialization network. The initialization phase may be exited upon expiration of a selected time period following the root node sending a final initialization data packet. In an additional aspect, the root and every internal node of the initialization network may forward every received data packet up to and including a packet intended for that node and every node of the initialization network may exit the initialization phase upon expiration of a selected time period following receiving a packet intended for that node.

In one aspect, when a node is in the initialization state: the node may 1) read initialization data from its initialization input data port every cycle, with no handshaking or other protocol which may be normally be used in the existing data communications network in execution phase, 2) store the data in the node's initialization logic; and/or 3) forward the data to the node's initialization data output port or ports, if any, after a delay of a predetermined number of cycles (usually one cycle later), with no handshaking or other protocol.

Figure 4:
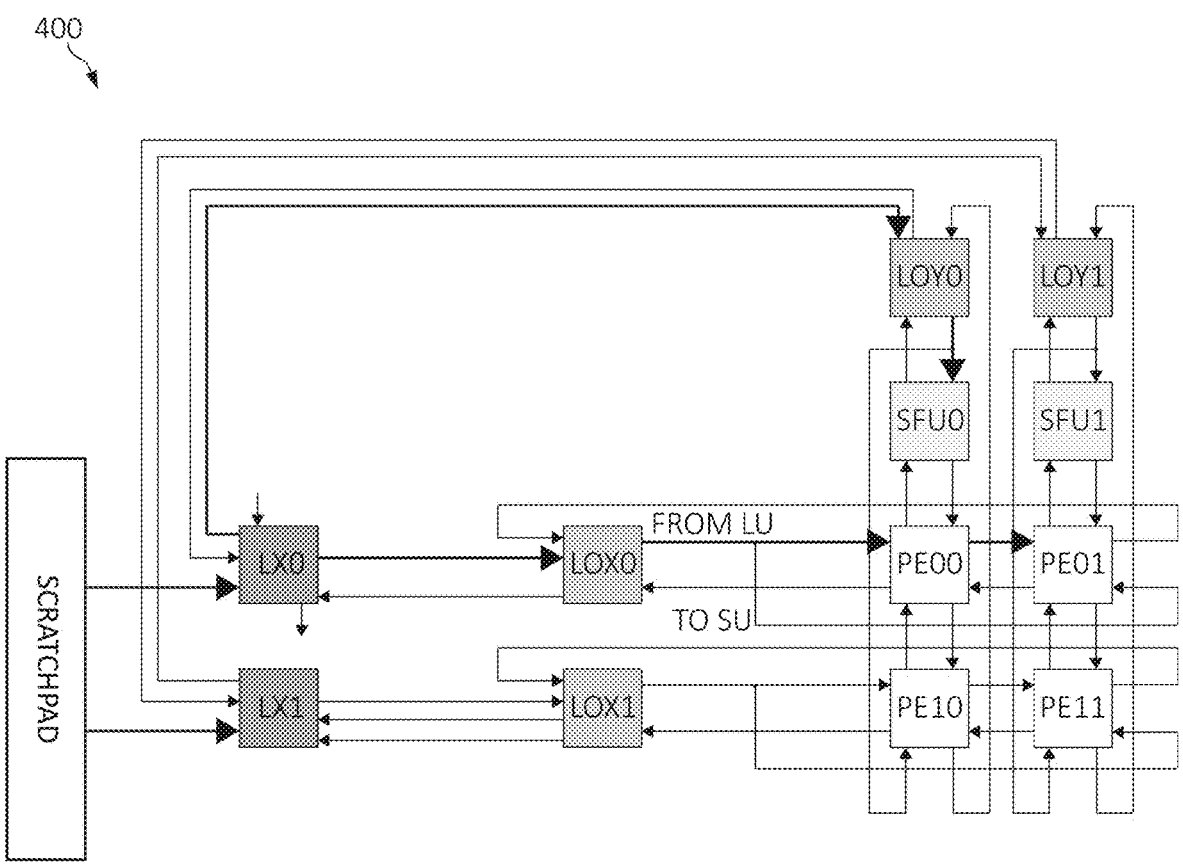
FIG. 4 is an additional block diagram depicting dataflow architecture in which aspects of the present invention may be realized.

Turning now to FIG. 4, a block diagram depicts a dataflow architecture 400 in which illustrative embodiments may be implemented. In one aspect, one or more of the components, modules, services, applications, and/or functions described in FIGS. 1-3 may be used in FIG. 4. The core architecture captures a customized dataflow with scratchpad memory.

As illustrated, the dataflow architecture 400 may include one or more of a variety of compute node/units such as, for example, those compute nodes labeled by way of example only as LX0-1, compute nodes labeled by way of example only as LOX0-1 and LOY0-1, one or more special function units (SFU) labeled by way of example only as SFU0-0, and one or more processing element (PE) labeled by way of example only as PE00-11. More specifically, each of the PE's are connected to each of the four nearest neighbors. The compute node SFU0-1, LOX0-1, LX0-1, and LOY0-1 are connected to each of the two nearest neighbors.

In one aspect, the PE compute nodes may be responsible for most, if not all, the computational operations. The other compute node nodes such as, for example, the LOX0-1, LX0-1, and LOY0-1 facilitate in data transfer by bringing data in from a scratchpad memory to enable a compute structure formed by an array of the PE compute nodes labeled as PE00-11 to work upon/execute the data based on a set of instructions.

That is, each of the compute nodes of the dataflow architecture 400, but not necessarily all of the core may take part in executing a program on this dataflow architecture/array. Each compute node/unit of FIG. 4 in the core participating in execution optionally needs to initialize some internal structures such as register files (e.g., a local register file "LRF") and other control structures and the instruction buffer (e.g., an "IBuff"). The instruction buffer (e.g., an "IBuff") needs to be initialized with a sequence of instructions that may be executed during an execution phase. The initialization data for a compute node/unit may be organized as a data packet that may include a header flit followed by one or more payload flits. The header flit has the information regarding the length and content of the payload flit so that an initialization state machine in a compute node/unit can steer the payload content to one or more internal structures (e.g., LRF, IBuff, etc). The total initialization data for any given application/program may include one or more initialization data packets. The initialization routing/dataflow topology is selectively chosen such that the initialization data flows occur over existing interconnect network that are used to transfer data during execution phase. Also, to simplify routing decisions, all initialization data packets pass through all compute nodes/units. Each compute node/unit has an initialization state machine that may decode the initialization header to determine if the incoming initialization data packet is meant for that particular compute node/unit or not. If the incoming initialization data packet is intended/meant for that particular compute node/unit, then the payload contents are copied into the relevant internal structures (LRF, IBuff, etc.). Regardless of the destination for the initialization data packet, each initialization data packet is forwarded to further node(s) of the initialization network until the initialization data packet is received by one or more leaf nodes of the initialization network.

Figure 5:
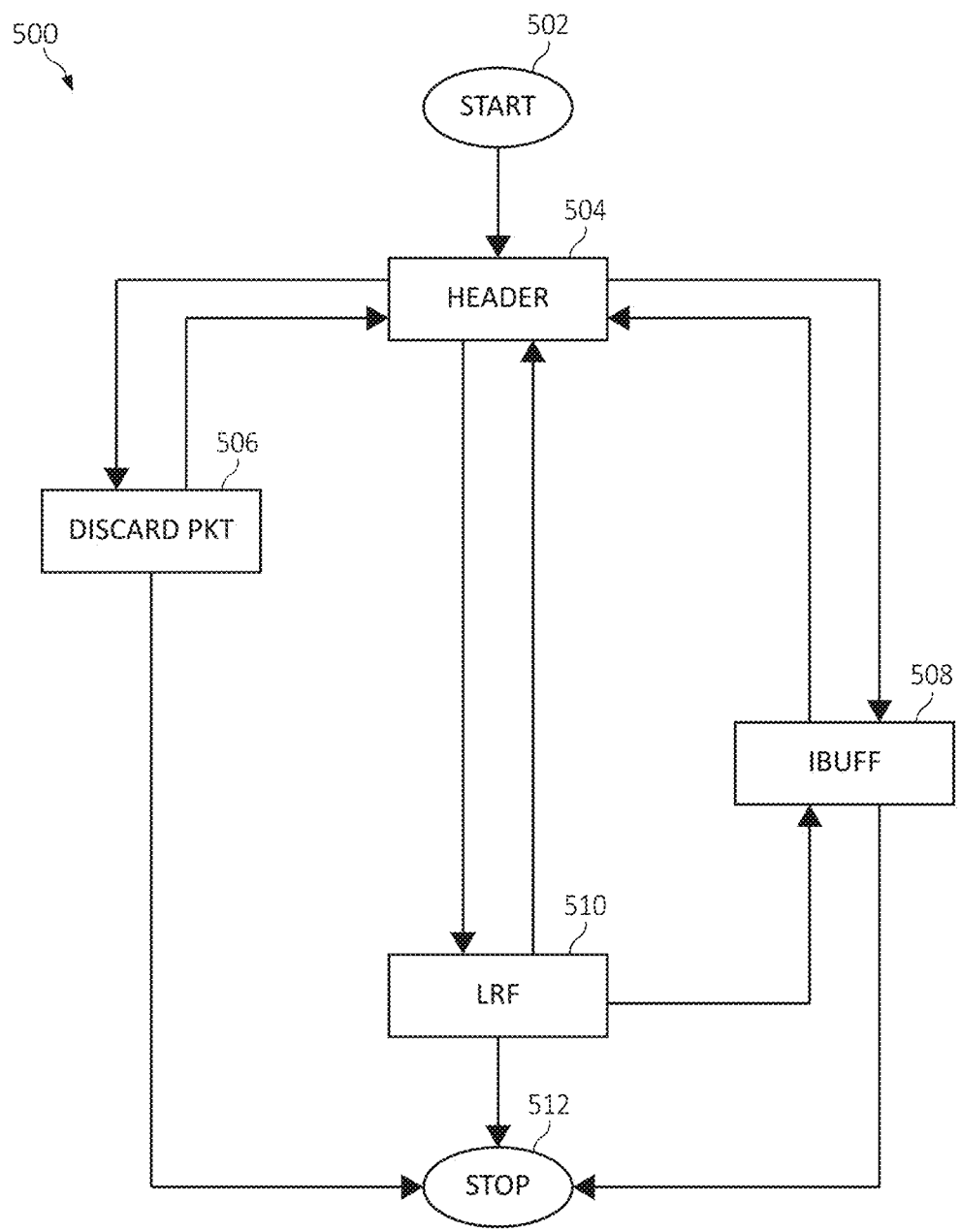
FIG. 5 is a diagram depicting a state diagram for implementing instruction initialization in a dataflow architecture in accordance with aspects of the present invention.

Turning now to FIG. 5, block diagram 500 depicts implementing instruction initialization in in an initialization network. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity. As shown, the various blocks of functionality are depicted with arrows designating the blocks' 500 relationships with each other and to show process flow/state change. Additionally, descriptive information is also seen relating each of the functional blocks 500.

Starting in block 502, a state machine may transition from an idle state into a header state on the rising edge of an initialization signal (e.g., "i_init" signal), as in block 504. A first received flit may be the header flit. The contents of the header flit of the header 504 is further illustrated in FIG. 7.

If a FLIT COUNT field (e.g., total flit count of FIG. 7) in the header flit is 0, the state machine remains in header state 504.

If the FLIT COUNT is greater than zero ("0") and a decoded target unit mask does not match the unit's decoded identifier ("ID"), the state machine enters into a discard packet ("DiscardPkt") state 506.

If the FLIT COUNT is greater than zero ("0") and a local register file ("LRF") COUNT>0, the state machine enters into an LRF state, as in block 510. If the FLIT COUNT is greater than zero ("0") and LRF COUNT equal to zero ("0"), the state machine enters into an instruction buffer ("IBuff") state 508.

In one aspect, the DiscardPkt state 506 indicates that the current initialization packet is not destined for this particular unit. The state machine waits for the FLIT COUNT number of flits before exiting if the current initialization packet is the last one. The state machine waits for FLIT COUNT number of flits before transitioning back to the header state 504 if the current initialization packet is not the last one.

The LRF may hold some internal state of the unit. For certain programs, LRFs may be required to be initialized with certain values. The state machine waits for LRF COUNT number of flits, initializes the LRF indices indicated by the LRF INDEX 0, LRF INDEX 1, up to LRF INDEX "X" (where x is LRF COUNT minus "1"). After the LRF COUNT flits, the state machine transitions back to the header state 504 if the FLIT COUNT equals the LRF COUNT and the current initialization packet is not the last one (e.g., indicated by the last initialization packet "INIT PKT" field in the header flit).

After the LRF COUNT flits, the state machine may stop/exit, as in block 512, if FLIT COUNT equals the LRF COUNT and the current initialization packet is the last one.

After the LRF COUNT flits, the state machine transitions to the IBuff state 508 if FLIT COUNT is greater than the LRF COUNT.

In an additional aspect, the IBUFF 508 may hold the instructions to be executed by a given unit. Each unit can hold up to a certain number of instructions (e.g., 64). For FLIT COUNT—LRF COUNT (e.g., FLIT COUNT minus the LRF COUNT) number of flits, the state machine initializes the local instruction buffer with each incoming flit in successive locations starting from 0. After FLIT COUNT—LRF COUNT (e.g., FLIT COUNT minus the LRF COUNT) flits, the state machine transitions back to the header state 504 if the current initialization packet was not the last one. After FLIT COUNT—LRF COUNT (e.g., FLIT COUNT minus the LRF COUNT) flits, the state machine may exit/stop if the current "i" initialization packet is the last one, as in block 512.

Figure 6:
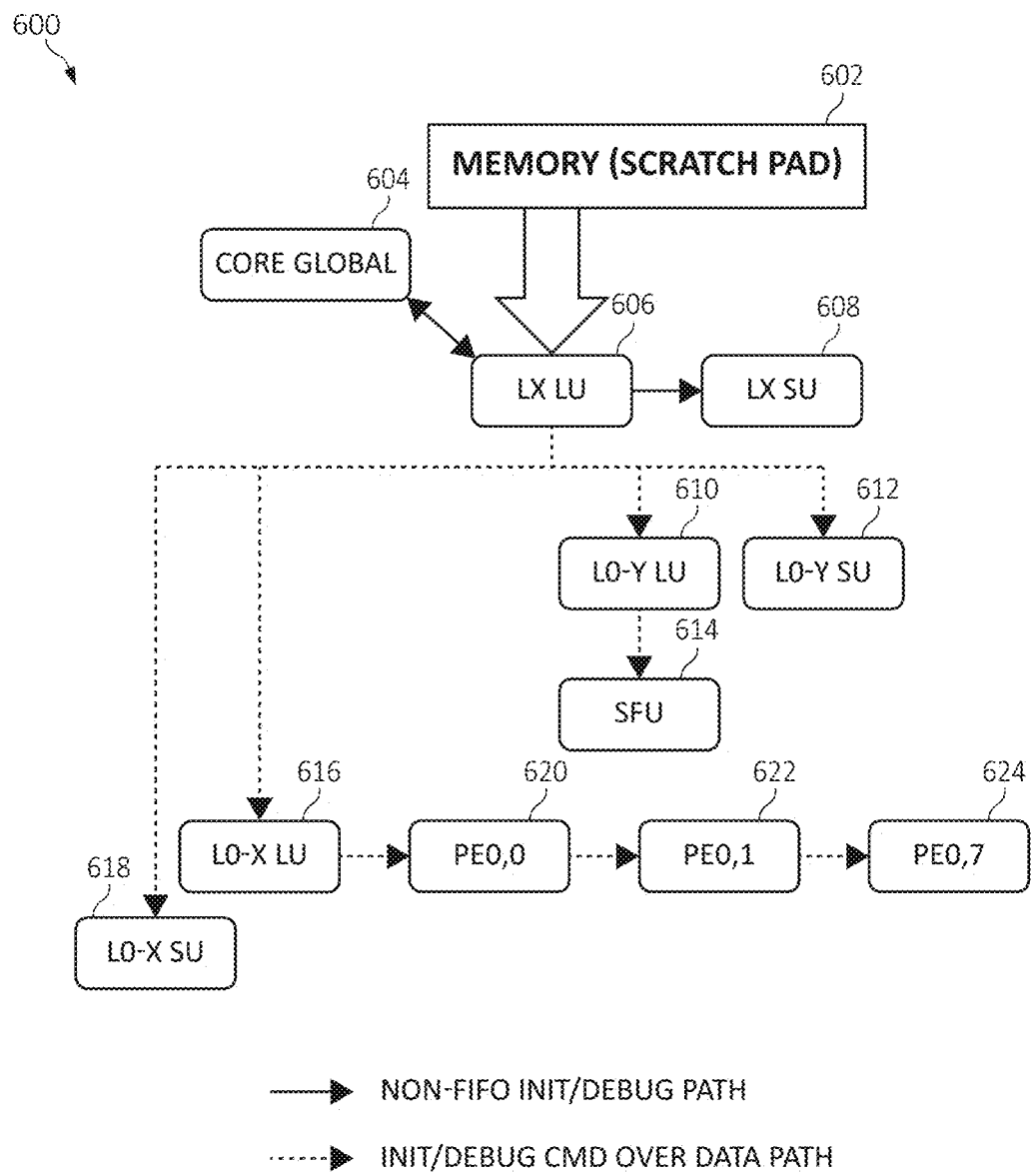
FIG. 6 is a block diagram depicting an initialization network in which aspects of the present invention may be realized.

Turning now to FIG. 6, block diagram 600 depicts operations for initialization of the nodes in an initialization network. In one aspect, a memory 632 (e.g., scratch pad memory) may be in direct contact with a compute node/unit 606 (e.g., a Lx load unit "LU"). The computational node/unit 606 may also be the closest compute node/unit to the memory 602.

The compute node/unit 606 may also be in direct communication with a core global component 604. In one aspect, the core global component 604 may be a global control logic that may control whether all of the compute nodes/units are in a special initialization state. If a compute node/unit is not in the initialization state, the compute node/unit is in a functional state. The functional states may include, for example, execution and quiescent states and a logic/program within a compute node/unit controls transitions between functional states. Each of the compute nodes/units have at least one path (or connection, or port) to input data from another unit and at least one port to output data to one or more other units. In a functional state, a compute node/unit may use a communication protocol to control when and whether to input or output data on these ports. The protocol can include handshaking signals (as commonly practiced). The compute node/unit's implementation of that protocol will use the state of the compute node/unit's internal logic, and may depend on a program being executed by the compute node/unit. The data on an output port of a unit similarly depends on the state of a unit's internal logic and the execution of its program. One port on a unit for functional input data is also its initialization input data port (similarly for output). When a unit is in the initialization state: the unit reads initialization from its initialization input data port every cycle, with no handshaking or other protocol; that data goes to the unit's initialization logic; that data is also transmitted on the unit's initialization data output port after a delay of a predetermined number of cycles (usually one cycle later), with no handshaking or other protocol.

At a high level overview, in one aspect, the core global component 604 ("core global") may commence an initialization phase by sending an initialization signal indicating to the compute node/unit 606 for initiating the initialization data prior to executing one or more applications in an execution phase.

The compute node/unit 606 (e.g., "root node" in an initialization network) may organize initialization data as data packets having one or more flits. The compute node/unit 606 may send/transmit each initialization data packet from the compute node/unit 606 to one or more of a plurality of compute nodes such as, for example, compute node 610 (e.g., "L0-Y LU"), compute node 612 (e.g., "L0-Y SU"), compute node 616 (e.g., "L0-X LU"), and compute node 618 (e.g., "L0-Y SU") using one or more existing data paths.

Each of the compute nodes such as, for example, compute node 610, compute node 612, compute node 616, and compute node 618 may be leaf or internal nodes of the initialization network with compute node/unit 606 as root node. Each of the compute nodes such as, for example, compute node 610, compute node 612, compute node 616, and compute node 618 may analyze a header of the data packet to determine the received data pack from the first node is intended for that compute node. Each of the compute nodes such as, for example, compute node 610, compute node 612, compute node 616, and compute node 618 may forward the received data packet to a subsequent compute node such as, for example, compute node 610 may forward a received initialization data packet to SFU 614, and compute node 616 may forward a received initialization data packet to compute node 620 (e.g., PE 0, 0), compute node 622 (e.g., PE 0, 1), and/or compute node 624 (e.g., PE 0, X).

More specifically, initialization data for each compute node (e.g., compute nodes 606, 608, 610, 612, 614, 616, 618, 620, 622, and/or 624) may be organized as an initialization data packet consisting of several 16B (16-byte) flits. Initialization flits may be sent over a 16B data interface. Each compute node may be listening for initialization flits on a predefined data interface. The initialization data packet may include a predefined behavior which dictates if a compute node is going to forward the initialization flits or drop the initialization flits. An initialization data packet may have multiple target compute nodes/units, which may be specified in the header. For example, if the LRF data and the instruction buffer code is common across PE nodes, all of those nodes may be initialized by one packet. In one aspect, the initialization may not necessarily update all IBuffs/LRFs, but may select any subset of LRFs or any sequential region of IBuff starting for a selected index (e.g., "index 0"). The steering of initialization data packets by the compute nodes may result in all initialization data packet reaching all nodes in the initialization network. In one aspect, each of the compute nodes may broadcast every initialization data packet to all child nodes, if any, in which case all compute nodes receive every initialization data packet.

In an additional aspect, each node may stop transmitting packets after it receives a packet specifying itself as a target. In this case, the data packets are ordered in memory so data packets to more distant nodes in the initialization network are distributed first. Also, in this case, once a node finishes processing and forwarding a packet with that node as target, it may ignore further packets at its initialization input port while still in initialization mode. An initialization sequence for a slice 0 (same sequence for all the slices) may be selected such as, for example, compute nodes 624 (PE07), . . . , compute nodes 622 (PE01), compute node 620 (PE00), compute node 608 (Lx SU0), compute node 618 (L0-X SU0), compute node 616 (L0-X LU0), compute node 612 (L0-Y SU0), compute node 614 (SFU0), compute node 610 (L0-Y LU0), compute node 606 (Lx LU0). A different sequence (or any other sequence) may also work but the above sequence achieves first initializes the farthest to nearest element in relations to the memory 602. The initialization connection may fan out from compute node 606 (Lx LU) where all initialization data packets be sent via all 4 connections such as, for example, compute node 606 (Lx LU) to compute node 618 (L0-X LU), compute node 608 (L0-X SU), compute node 610 (L0-Y LU), and compute node 612 (L0-Y SU). One or more additional compute nodes may be covered via compute node 610 (L0-Y LU) such as, for example, compute node 614 (SFU). Also, additional compute nodes may be covered via compute node 610 (L0-X LU) such as, for example, compute node 620 (PE0,0), compute node 622 (PE0,1), . . . , compute node 624 (PE-7), and/or compute node 608 (Lx SU).

In one aspect, some nodes in the initialization network are leaf nodes which receive initialization data but do not forward it, e.g. node 614 (SFU) and 624 (PE0,7). Some nodes are internal nodes, such as 610 (L0-YLU) which receive and forward initialization data. One node, such as

606 (LX LU) is the root node which gets initialization data from the scratchpad memory and forwards it to the rest of the initialization network.

In an additional aspect, for example, the PE (e.g., compute node 620 (PE 0,0), compute node 622 (PE 0,1), and/or compute node 624 (PE 0, X)) may listen for initialization flits on a first interface and forwards all incoming flits on an alternative interface. The Pes may use an existing two-cycle first-in-first-out ("FIFO") data path: operand latch and FIFO latch to forward initialization data on a link, which may add a multiplexer ("MUX") select control, but no mux ports or cross-unit buses. All incoming initialization flits may always be consumed (e.g., no backpressure) during the initialization phase.

Thus, as mentioned, the present invention provides for entering into an initialization phase and exiting from the initialization phase.

To enter the initialization phase, an initialization component (e.g., core global component 604) may broadcast a signal (e.g., a core level "i_init" generation and distribution signal). The "i_init" may be a synchronous, timed signal operating at 2 gigahertz ("GHz"). The core global component 604 may generate the "i_init" signal to initiate the initialization process. The "i_init" from the core global component 604 goes to a root node such as, for example, compute node 606 (Lx Lu). The "i_init" signal distribution from the root node to all other compute nodes follows the same hops as initialization data. A node which is a root or internal node may register the i_init signal for up to two cycles and then forwards the initialization signal to the same nodes to which it forwards initialization data. For example, 606 (Lx Lu) in each lane may register the signal for up to two cycles to match an initial data path depth and forwards the signal to compute node 608 (Lx SU), compute node 616 (L0-X LU), compute node 618 (L0-X SU), compute node 610 (L0-Y LU) and compute node 612 (L0-Y SU).

The L0 LU's (e.g., compute nodes 610, 616, and 618) register the signal for up to two cycles and forward the signal to a nearest PE (e.g., compute node 620 (PE 0, 0)). The nearest PE (e.g., compute node 620 (PE 0, 0)) registers the signal for up to two cycles and forwards the signal to a neighbor. The process continues until the signal reaches the farthest PE (e.g., compute node 624 (PE 0, X)) in the lane. Hence, each unit may receive the signal (e.g., the "i_nit" signal) at different times (e.g., up to 20 cycles apart) but prior to the initialization data can reach it. A unit level (e.g., "local_init") signal may be generated in each compute node/unit by registering the "i_init" signal twice to generate a "local_init" and each compute node/unit may use the generated "local_init" signal for initialization, which is the same "i_init" signal sent to the next compute node/unit (e.g., no separate latching)

To exit the initialization phase, the root node 606 (Lx LU), after sending the last flit of the last initialization data packet (identified by a "last" field in the header), sets the i_init signal of its child nodes to 'false,' exits initialization mode and enters execution mode. Each internal node of the initialization network forwards this false value in turn to the i_init signals of its child nodes, and also exits initialization mode. Once all nodes in the network have a false i_init signal, there is no longer any initialization data in the network, and all nodes have left initialization mode.

Figure 7:
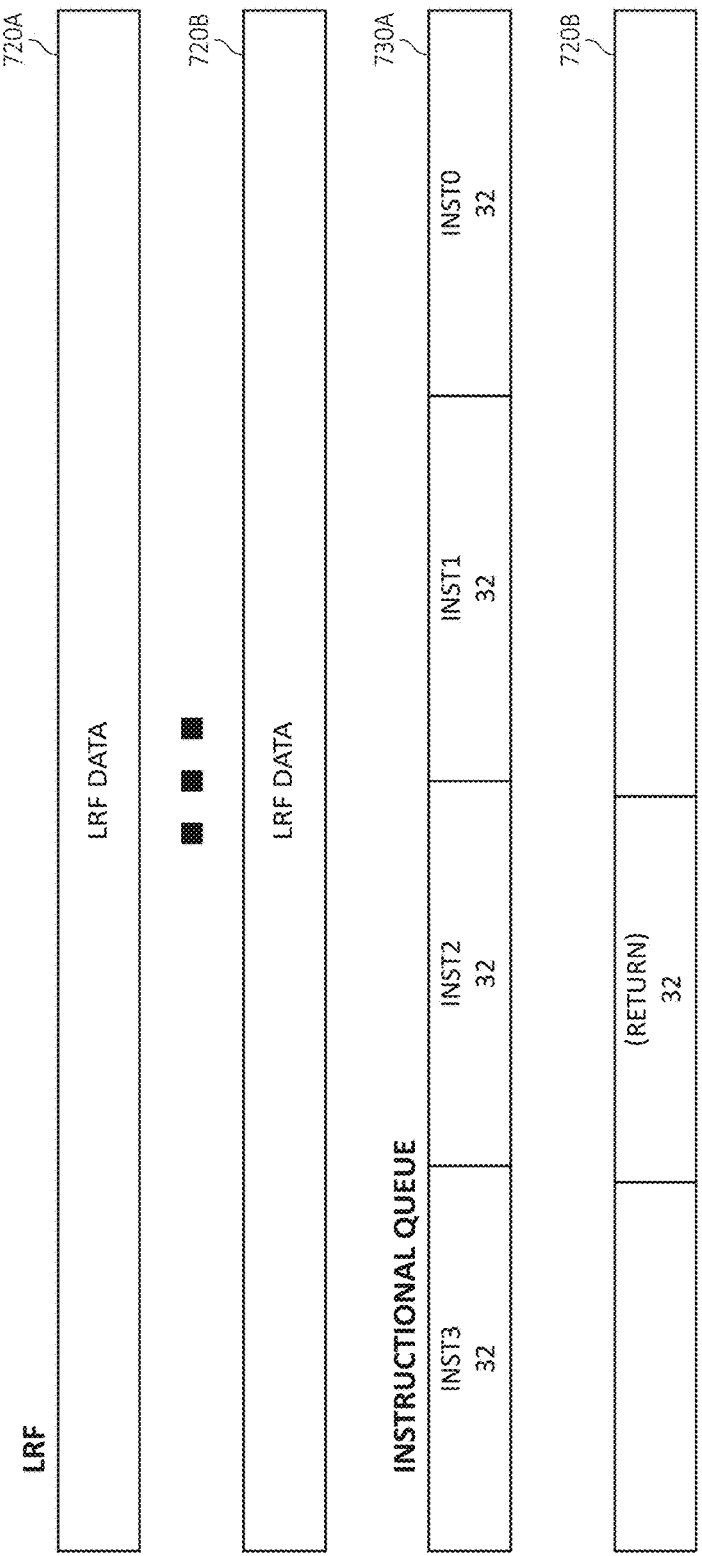
FIG. 7 is an additional block diagram depicting initialization packet format in which aspects of the present invention may be realized.

Turning now to FIG. 7, block diagram 700 depicts an initialization data packet format for implementing instruction initialization in a dataflow architecture, which may, for example, be implemented in FIGS. 1-6. In one aspect, the initialization data packet format may include a header 710, one or more LRF such as, for example, LRF 720A and LRF 720B, and/or and instruction buffer such as, for example, instruction buffer 730.

In one aspect, the first flit of a data packet may be the header 710 which contains 1) a target unit mask, 2) a flit count, 3) an LRF count, 4) a bit indicating that this packet is the last initialization packet ("pkt"), and 5) one or more LRF indexes. The target unit mask may indicate that each unit (e.g., PE, LU, SU, and/or SFU of FIG. 6) in a lane is assigned a unique 15 bit one-hot mask. Upon receiving the header flit, each computational node/unit uses its identifier "ID" as a mask against the target unit mask field to determine if it is an intended recipient of the packet or an unintended recipient. The flit count is the number of flits (16B transfers) in the data packet (excluding the header). The number of LRF to be initialized is given in the LRF count. The last initialization packet indicates to the root node (e.g., LX LU) that this is the last initialization packet. The node uses the LRF count number of the one or more LRF index fields to determine which LRFs to initialize with data from following flits.

In an additional aspect, initialization may be performed (e.g., may be optional) for one or more LRFs (e.g., LRF 720A and 720B). A flit may only have LRF data if the "Flit count" field of header 710 is greater than land the "LRF count" field of the header 710 is greater than 0. It should be noted that there may be as many LRF flits as indicated by the "LRF count" field. Also, "LRFIndex0" through "LRFIndexF" of the header 710 may contain the LRF indexes for each LRF flit, which may be in sequence.

In an additional aspect, initialization may be performed (e.g., may be optional) for initialization of the instruction buffer 730 (e.g., initialization of one or more instructions such as, for example instruction "inst" 0, inst 1, inst 2, inst 3, and a return instruction). If the "flit count" field of header 710 is greater than 1 plus the LRF count (e.g., flit count is greater than 1+"LRF count"), then the flits the last LRF flit (or after the header if there are no LRF flits) may have instruction flits.

Figure 8:
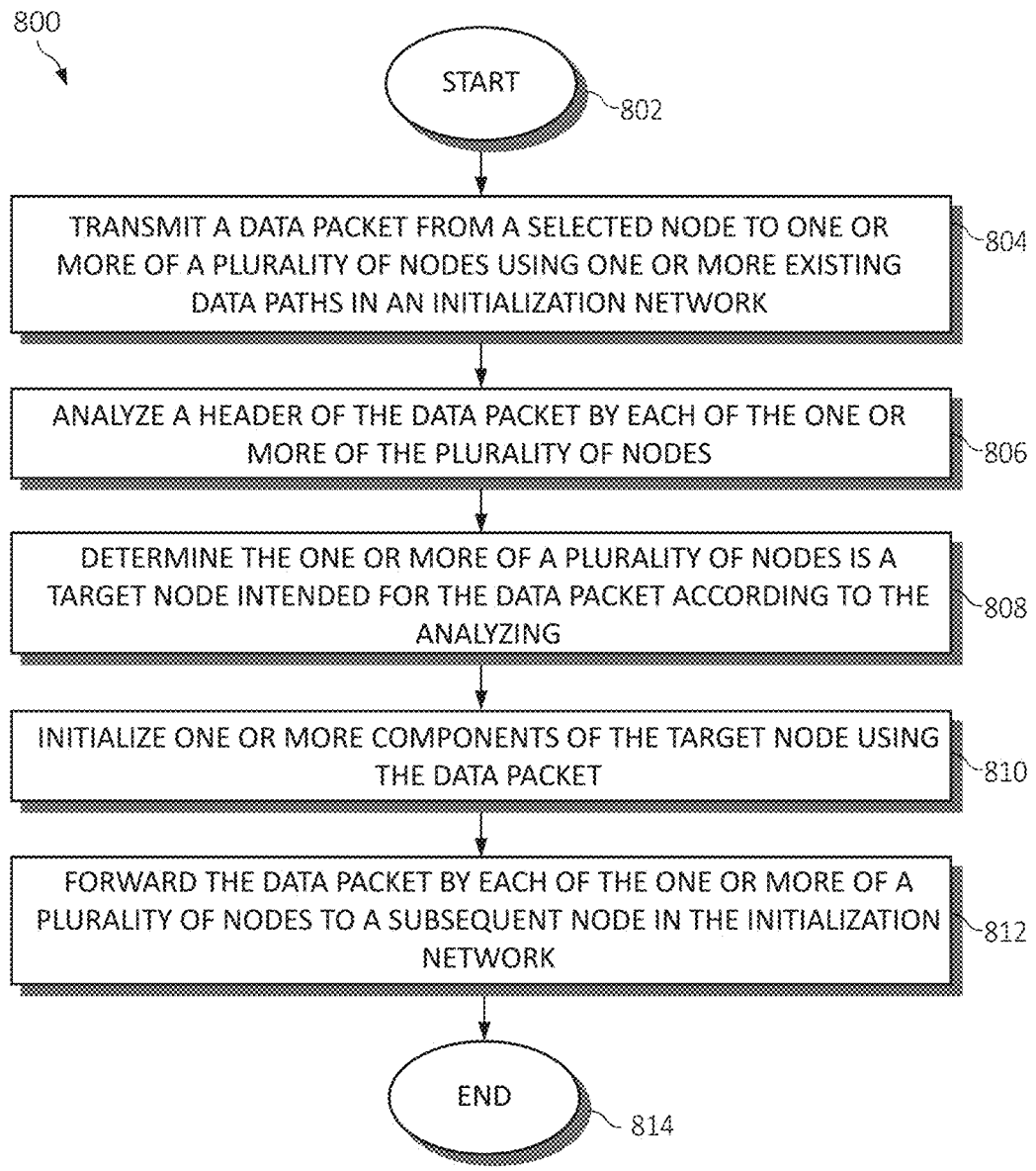
FIG. 8 is a flowchart diagram depicting an exemplary method for implementing instruction initialization in a dataflow architecture in a computing environment by a processor, again in which aspects of the present invention may be realized.

Turning now to FIG. 8, a method 800 for implementing instruction initialization in a dataflow architecture in a computing environment by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

Initialization data is organized as initialization data packets having one or more flits, as in block 804. Each initialization data packet may be transmitted from a first compute node to one or more of a plurality of compute nodes using one or more existing data paths, as in block 806. One or more components of a target compute node may be initialized using a received initialization data packet and the received initialization data packet may be forwarded to a subsequent compute node, as in block 808. The functionality 800 may end, as in block 810.

In one aspect, in conjunction with and/or as part of at least one block of FIG. 8, the operations of method 800 may include each of the following. The operations of method 800 may define the first compute node as a root node and having both a closest distance and a direct connection to a scratch pad memory, define the each of the plurality of compute nodes as leaf nodes in relation to the root node, and/or define the data packets as initialization data packets intended for the one or more of the plurality of compute nodes. The operations of method 800 may also define the data packet to include a header that identifies each target compute node intended for receiving the data packet and a defined length of the data packet.

The operations of method 800 may initialize an instruction buffer associated with the target compute node upon determining, by the target compute node, the received data pack from the first node is intended for the target compute node. The operations of method 800 may analyze a header of the data packet to determine the received data pack from the first node is intended for the target compute node.

The operations of method 800 may commence an initialization phase by sending an initialization signal indicating to the first compute node, the one or more of the plurality of compute nodes, or a combination thereof a time period for initiating the initialization data prior to executing one or more applications in an execution phase, and/or exit the initialization phase upon expiration of a selected time period following the first compute node sending a final data packet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing instruction initialization in a dataflow architecture in a computing environment by a processor, comprising:
transmitting initialization data organized as a data packet, from a selected node to one or more of a plurality of nodes being in an initialization mode, using one or more existing data paths in an initialization network, wherein the initialization mode is entered by each of the plurality of nodes upon receiving, at an initialization input data port, a core-level initialization and distribution ("i_init") signal comprising a synchronous, timed signal operating at a predefined frequency;
responsive to receiving the data packet, reading and storing the initialization data of the data packet from the initialization input data port at each cycle during the initialization state without performing a handshake protocol otherwise used in an execution phase, and further determining, by each respective node of the one or more of a plurality of nodes, whether the respective node performing the determining is a target node intended for the data packet, wherein those of the plurality of nodes determined to be the target node initialize one or more components of the target node using the initialization data of the data packet;
commensurate with determining that the respective node is not the target node, forwarding the data packet by the respective node to a subsequent node in the initialization network, wherein the initialization data is transmitted on an initialization output data port without performing the handshake protocol following a delay of a predetermined number of cycles; and
commensurate with determining that the respective node is the target node, ceasing forwarding of and ignoring any subsequent data packets received at the initialization input data port of the respective node while in the initialization mode, wherein the initialization mode is exited by each of the plurality of nodes upon receiving a false value of the i_init signal propagated throughout each of the plurality of nodes in the initialization network.

2. The method of claim 1, further including analyzing a header of the data packet for determining those of the plurality of nodes intended as the target node.

3. The method of claim 1, further including initializing an instruction buffer in the target node using instructions within the initialization data from of the data packet upon determining those of the plurality of nodes is the target node.

4. The method of claim 1, further including commencing an initialization phase by sending an initialization signal indicating to the selected node, the plurality of nodes, or a combination thereof at a selected time period for initiating the data packet prior to executing one or more applications in an execution phase.

5. The method of claim 4, wherein forwarding the data packet includes forwarding the data packet received by each of the one or more of a plurality of nodes to one or more child nodes in the initialization network.

6. A system for implementing instruction initialization in a dataflow architecture in a computing environment, comprising:
one or more computers with executable instructions that when executed cause the system to:
transmit initialization data organized as a data packet, from a selected node to one or more of a plurality of nodes being in an initialization mode, using one or more existing data paths in an initialization network, wherein the initialization mode is entered by each of the plurality of nodes upon receiving, at an initialization input data port, a core-level initialization and distribution ("i_init") signal comprising a synchronous, timed signal operating at a predefined frequency;
responsive to receiving the data packet, read and store the initialization data of the data packet from the initialization input data port at each cycle during the initialization state without performing a handshake protocol otherwise used in an execution phase, and further determine, by each respective node of the one or more of a plurality of nodes, whether the respective node performing the determining is a target node intended for the data packet, wherein those of the plurality of nodes determined to be the target node initialize one or more components of the target node using the initialization data of the data packet;
commensurate with determining that the respective node is not the target node, forward the data packet by the respective node to a subsequent node in the initialization network, wherein the initialization data is transmitted on an initialization output data port without performing the handshake protocol following a delay of a predetermined number of cycles; and
commensurate with determining that the respective node is the target node, cease forwarding of and ignoring any subsequent data packets received at the initialization input data port of the respective node while in the initialization mode, wherein the initialization mode is exited by each of the plurality of nodes upon receiving a false value of the i_init signal propagated throughout each of the plurality of nodes in the initialization network.

7. The system of claim 6, wherein the executable instructions analyze a header of the data packet for determining those of the plurality of nodes intended as the target node.

8. The system of claim 6, wherein the executable instructions initialize an instruction buffer in the target node using instructions within the initialization data from of the data packet upon determining those of the plurality of nodes is the target node.

9. The system of claim 6, wherein the executable instructions commence an initialization phase by sending an initialization signal indicating to the selected node, the plurality of nodes, or a combination thereof at a selected time period for initiating the data packet prior to executing one or more applications in an execution phase.

10. The system of claim 9, wherein forwarding the data packet includes forwarding the data packet received by each of the one or more of a plurality of nodes to one or more child nodes in the initialization network.

11. A computer program product for implementing instruction initialization in a dataflow architecture by a processor in a computing environment, the computer program product comprising a non-transitory computer-readable storage medium having computer-readable program code portions stored therein, the computer-readable program code portions comprising:

an executable portion that transmits initialization data organized as a data packet, from a selected node to one or more of a plurality of nodes being in an initialization mode, using one or more existing data paths in an initialization network, wherein the initialization mode is entered by each of the plurality of nodes upon receiving, at an initialization input data port, a core-level initialization and distribution ("i_init") signal comprising a synchronous, timed signal operating at a predefined frequency;

an executable portion that, responsive to receiving the data packet, reads and stores the initialization data of the data packet from the initialization input data port at each cycle during the initialization state without performing a handshake protocol otherwise used in an execution phase, and further determines, by each respective node of the one or more of a plurality of nodes, whether the respective node performing the determining is a target node intended for the data packet, wherein those of the plurality of nodes determined to be the target node initialize one or more components of the target node using the initialization data of the data packet;

an executable portion that initializes one or more components of the target node using the data packet;

an executable portion that, commensurate with determining that the respective node is not the target node, forwards the data packet by the respective node to a subsequent node in the initialization network, wherein the initialization data is transmitted on an initialization output data port without performing the handshake protocol following a delay of a predetermined number of cycles; and an executable portion that, commensurate with determining that the respective node is the target node, ceases forwarding of and ignoring any subsequent data packets received at the initialization input data port of the respective node while in the initialization mode, wherein the initialization mode is exited by each of the plurality of nodes upon receiving a false value of the i_init signal propagated throughout each of the plurality of nodes in the initialization network.

12. The computer program product of claim 11, further including an executable portion that analyzes a header of the data packet for determining those of the plurality of nodes intended as the target node.

13. The computer program product of claim 11, further including an executable portion that initializes an instruction buffer in the target node using instruction instructions within the initialization data from of the data packet upon determining those of the plurality of nodes is the target node.

14. The computer program product of claim 11, further including an executable portion that:

commence an initialization phase by sending an initialization signal indicating to the selected node, the plurality of nodes, or a combination thereof at a selected time period for initiating the data packet prior to executing one or more applications in an execution phase; and forwards each data packet received by each of the one or more of a plurality of nodes to one or more child nodes in the initialization network.

\* \* \* \* \*